(12) United States Patent
Palzer et al.

(10) Patent No.: US 11,089,796 B2
(45) Date of Patent: Aug. 17, 2021

(54) NITROGEN INFUSED HIGH YIELD SOLUBLE COFFEE AND METHODS THEREOF

(71) Applicant: NESTEC S.A., Vevey (CH)

(72) Inventors: Stefan Palzer, Lausanne (CH); Marie-Laure Jung, Saint-Legier (CH); Matthieu Pouzot, Lausanne (CH); Gerhard Niederreiter, Savigny (CH); Federico Mora, Morges (CH); Cecile Gehin-Delval, Les Hospitaux Neufs (FR)

(73) Assignee: Societe des Produits Nestle S.A., Vevey (CH)

( * ) Notice: Subject to any disclaimer, the term of this patent is extended or adjusted under 35 U.S.C. 154(b) by 199 days.

(21) Appl. No.: 16/308,555

(22) PCT Filed: Jun. 8, 2017

(86) PCT No.: PCT/EP2017/064021
§ 371 (c)(1),
(2) Date: Dec. 10, 2018

(87) PCT Pub. No.: WO2017/211984
PCT Pub. Date: Dec. 14, 2017

(65) Prior Publication Data
US 2019/0150467 A1    May 23, 2019

(30) Foreign Application Priority Data
Jun. 10, 2016 (EP) .................................. 16173946

(51) Int. Cl.
*A23F 5/32* (2006.01)
*A23F 5/42* (2006.01)
*A23F 5/24* (2006.01)
*B67D 1/00* (2006.01)

(52) U.S. Cl.
CPC ................ *A23F 5/42* (2013.01); *A23F 5/243* (2013.01); *B67D 1/00* (2013.01); *A23F 5/32* (2013.01)

(58) Field of Classification Search
CPC .... A23F 5/36; A23F 5/24; A23F 5/483; A23F 5/42; A23F 5/243; A23F 5/32; A23F 5/26; A23F 5/246; A23F 5/28; A23F 5/267; A47J 31/002; A47J 31/16; A47J 31/44
See application file for complete search history.

(56) References Cited

U.S. PATENT DOCUMENTS

| 4,324,808 A | 4/1982 | Wertheim et al. |
| 2004/0105923 A1 | 6/2004 | O'Connell |

FOREIGN PATENT DOCUMENTS

| EP | 0745329 | 12/1996 |
| EP | 0826308 | 3/1998 |
| EP | 0916267 | 5/1999 |
| EP | 1133923 | 9/2001 |
| EP | 1135992 | 9/2001 |
| EP | 1198992 | 4/2002 |
| WO | 2012069359 | 5/2012 |

*Primary Examiner* — Hong T Yoo
(74) *Attorney, Agent, or Firm* — K&L Gates LLP

(57) ABSTRACT

The present invention relates to a coffee beverage comprising a high yield coffee (HYC) infused with nitrogen thus producing a refreshing cold foamy and creamy beverage; wherein HYC represents liquid coffee having anhydrocarbohydrate content between 25 and 42% w/w.

6 Claims, 3 Drawing Sheets

NITROGEN INFUSED HIGH YIELD SOLUBLE COFFEE AND METHODS THEREOF

CROSS REFERENCE TO RELATED APPLICATIONS

The present application is a National Stage of International Application No. PCT/EP2017/064021, filed on Jun. 8, 2017, which claims priority to European Patent Application No. 16173946.1, filed on Jun. 10, 2016, the entire contents of which are being incorporated herein by reference.

FIELD OF THE INVENTION

The present invention relates to a coffee beverage comprising a high yield coffee (above 25% yield based on R&G coffee solids obtained by hydrolysis above 100° C.) infused with nitrogen which produces a refreshing cold foamy and creamy beverage.

BACKGROUND

Today nitrogen gas is widely used to store and dispense carbonated beverages such as beer and soda. Coffee infused with nitrogen (for example "nitro coffee") has become a popular beverage recently. Nitro coffee is a typically a cold-brew coffee with dissolved nitrogen. Cold brew coffee is considered a low yield coffee with yields in the range of 10-15% and with coffee solids in the range of 0.5-1.5%. This cold beverage is very low in calories, contains no added sugar or alcohol and is entirely a natural product. A key aspect of such chilled beverage is the foam. Nitrogen bubbles show a spectacular cascading effect in cold coffee by first appearing through nucleation, the dissolved gas and sinking to bottom of the receiver (a mug or glass) followed by ascending to the surface while eventually forming an indulgent creamy foam layer. Coffee aromas in concentrates or ready-to-drink (RTD) is known to be not very stable, hence delivering cold brew high quality aroma is challenging.

Apart from nitro coffee described above, nitrogen is also used in trace amounts in packaged beverages to replace oxygen while packaging. WO2014176102 describes such an aseptic hot-brewed package coffee or expresso beverage containing trace amounts of nitrogen to replace oxygen in the package for increasing shelf-life of the beverage. EP0745329 described a carbonated coffee beverage which has been packaged under pressure in a pressure-resistant closed container, which beverage is based on coffee extract, and wherein the coffee beverage has been packaged in the closed container in the presence of $CO_2$ and nitrogen.

The advantage of the present invention over beverages cited above is foam stability, and taste profile, as high yield coffees have a higher amount of high molecular mass carbohydrates and a different chemical composition which allows better foam stability and a different taste profile (lower acidity and higher mouthfeel).

SUMMARY OF THE INVENTION

The present invention relates to a coffee beverage comprising a high yield coffee (HYC) infused with nitrogen thus producing a refreshing cold foamy and creamy beverage; wherein HYC represents an extraction yield above 25% based on the hydrolysis above 100° C. of roast and ground (R&G) coffee solids.

In another aspect, the present invention relates to a system for dispensing the beverage of claims 1 to 5, wherein the system comprises: a beverage tank capable of being pressurized; a coupler to tap the beverage tank; a controlled supply of nitrogen or a mixed nitrogen gas under controlled pressure; supply lines to the nitrogen gas and coffee extract and a contact unit; and draft column with dispenser units.

In yet another aspect, the present invention relates to a process of preparing a beverage of claim 1, wherein the process comprises the steps of: extracting coffee solids from roasted and ground coffee beans using water at a temperature of between 100° C. and 200° C. to obtain a coffee extract wherein the extraction yield is above 25% based on the raw material comprising roast and ground (R&G) coffee solids; optionally diluting the coffee extract to 1.3% of coffee solids in total weight of the beverage; and infusing nitrogen gas into the coffee extract.

DETAILED DESCRIPTION OF THE INVENTION

Figure 1:
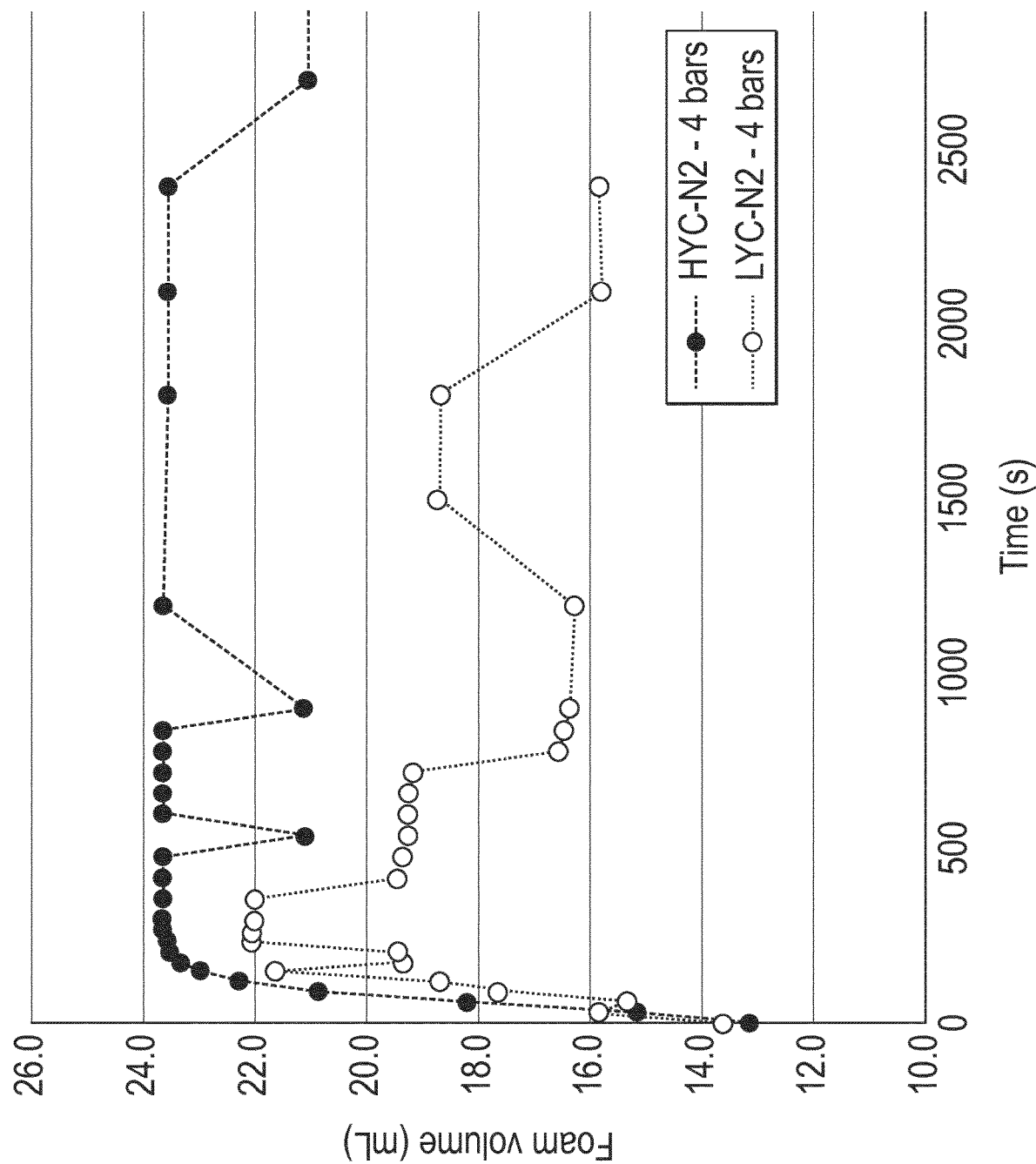
FIG. 1 presents a measurement of foam volume vs time using nitrogen infused coffee extract of high yield coffee (HYC) and low yield coffee (LYC). Foam made of HYC has a higher initial volume (24 mL) and demonstrates a high stability over a long period of time (same volume after 200 s). As a comparison, foam made of LYC has a significantly lower initial volume and demonstrates a poor stability (loss of approximately 30% of the initial foam volume after 500 s).

According to the present invention the term "beverage" means any noncarbonated aqueous liquid material that is a homogeneous liquid substantially free of solids having a flavor due to dissolved components.

The term "anhydrocarbohydrate" refers to carbohydrate distribution of essentially mannose, arabinose and galactose in HYC. The total content in HYC ranges from 35 to 45% w/w. In one embodiment, the carbohydrate distribution of the coffee of the present invention may comprise for instance about 41.9 w/w % which comprises essentially 19.9% mannose; 18.1% galactose and 3.3% arabinose. In another embodiment, the carbohydrate distribution of the coffee of the present invention may comprise for instance about 43.6 w/w % which comprises essentially 21.2% mannose; 17.5% galactose and 4.4% arabinose.

According to the present invention dispensing of the chilled beverage means opening a faucet of the system to allow the chilled "nitrogen infused" beverage to flow from the system into a receiver such as a glass, mug or other drinking container. Throughout the following description the term "nitrogen infused" will be used to describe a nitrogen rich coffee beverage having either $N_2$ or $N_2O$ or $N_2/CO_2$ or $N_2/N_2O/CO_2$ infused beverage. If an embodiment is directed specifically to a $N_2/CO_2$ mixture or specifically to only $N_2$ infusion, the actual gas composition is explicitly disclosed.

Dispensing of the nitrogen infused chilled beverage is an element of the present invention wherein reduction of pressure on the gas infused beverage allows the nucleation of the dissolved gas producing micro bubbles resulting in unique properties which distinguish the dispensed beverage by enhancement of the beverage's flavor and/or appearance. For instance appearance of foam and stability of foam over time and taste and aroma of coffee delivered through this beverage.

In one embodiment, the present invention relates to a coffee beverage comprising a HYC infused with nitrogen, wherein the coffee is present in amounts ranging from 0.5 to 4 wt % and wherein HYC represents an extraction yield above 25% based on the raw material comprising roast and ground (R&G) coffee solids is obtained by a hydrolysis above 100° C. In another embodiment, the coffee solids is obtained by a hydrolysis above 110° C. or 120° C.

In yet another embodiment of the present invention, the nitrogen is a pure nitrogen gas having at least 99.5% $N_2$.

In yet another embodiment of the present invention, the pressure applied on beverage tank ranges from 2-4 bars.

In an embodiment, the present invention relates to a process of preparing a beverage wherein the process comprises the steps of: extracting coffee solids from roasted and ground coffee beans using water at a temperature of between 100° C. and 200° C. to obtain a coffee extract wherein the extraction yield is above 25% based on the raw material comprising roast and ground (R&G) coffee solids; drying the coffee extract to a powder and later reconstituting the powder into a liquid composition having a minimum of 1.3% of coffee solids in total weight of the beverage, prior to infusing nitrogen gas into the reconstituted liquid composition.

If the coffee extract is used, said coffee extract is diluted to 1.3% of coffee solids in total weight of the beverage; and infusing nitrogen gas into the coffee extract.

In yet another embodiment of the present invention, during the process of preparing the final beverage, the coffee extract is pressurized with nitrogen at about 2-4 bar for 48 hrs at about 4-8° C. prior to dispensing the final beverage.

In one embodiment, the coffee solids obtained from hydrolysis is obtained as a granulated frozen extract. A granulated frozen coffee extract may be provided by any suitable means; preferably it is provided by injecting gas into a liquid coffee extract, freezing the gas injected liquid coffee extract, and granulating the frozen gas injected coffee extract. During production of freeze dried soluble coffee powders it is normal practice to produce a liquid coffee extract, inject gas into the liquid extract, freezing the gas injected extract and granulating the frozen extract, and conventional methods employed in the production of freeze dried soluble coffee may be used.

The granulated frozen coffee extract preferably has a water content of between about 25 and about 75% by weight, more preferably between about 35 and about 65%, even more preferably between about 40 and about 55%. The particle size of the granulated frozen coffee extract is preferably between about 300 and about 3600 microns, more preferably between about 600 and about 2500 microns, even more preferably between about 1000 and about 2200 microns.

In one embodiment the HYC may comprise a mix of powders such as a mix of porous spray dried coffee powder mixed with the heated granulated frozen coffee extract to produce particles of the frozen coffee extract covered by particles of the porous spray dried coffee powder. The weight ratio of porous spray dried powder and granulated frozen coffee extract is preferably between about 66:33 and about 20:80 during the mixing. The mixing may be performed by any suitable methods, e.g. by using a paddle mixer for a preferred period of time.

Freeze Drying

After mixing, the particles of the frozen coffee extract covered by particles of the porous spray dried coffee powder are freeze dried to produce the soluble coffee powder of the invention. Methods for freeze drying soluble coffee are well known in the art and any suitable method may be used.

In a preferred embodiment of the invention the soluble coffee powder produces a foam volume of at least about 1 mL, more preferably at least about 2 mL, when 5 g of soluble coffee powder is dissolved in 200 mL water at 90° C. Such a foam is enhanced by infusing nitrogen in to such a composition.

EXAMPLES

Example 1

Experiment 1: Pure Soluble Coffee in a Keg Infused with Nitrogen

A coffee solution of 30 liters, dosing at 1.3% coffee solids, in cold water was prepared using NESCAFE® Gold Freeze-dried coffee (hot brew, high yield HYC). This solution was placed in a keg under pressure at 3-4 bar using Nitrogen gas. The Keg was placed in a cold room at 4-8C for 48 hours. The pressure was checked regularly to ensure minimum of 3 bars. After 48 hours, the keg was connected to a standard beer tap and to the nitrogen bottle to release the liquid through the beer tap. The beverage was served in a glass mug. A nice foamy and creamy beverage with cascading of foam was recorded.

Experiment 2: Pure Soluble Coffee Infused with $N_2O$ Through a Whipped Cream Device Comparison with Standard Soluble Coffee Prepared Cold w/o $N_2O$ A coffee solution of 1.5 liters, dosing at 1.3% coffee solids, in cold water was prepared using NESCAFE Gold Freeze-dried coffee (hot brew, high yield). The solution was placed in the fridge at 4-8° C. Once cooled to 4-8° C. 400 ml of the coffee solution was poured in to a whipping cream device container (Kisag) and infused with 1 cartridge of $N_2O$. The container was shaken three times upside down and solution was served by releasing the gas along with the coffee solution. As a reference the same cold soluble coffee preparation without any infusion of gas was used.

Figure 3:
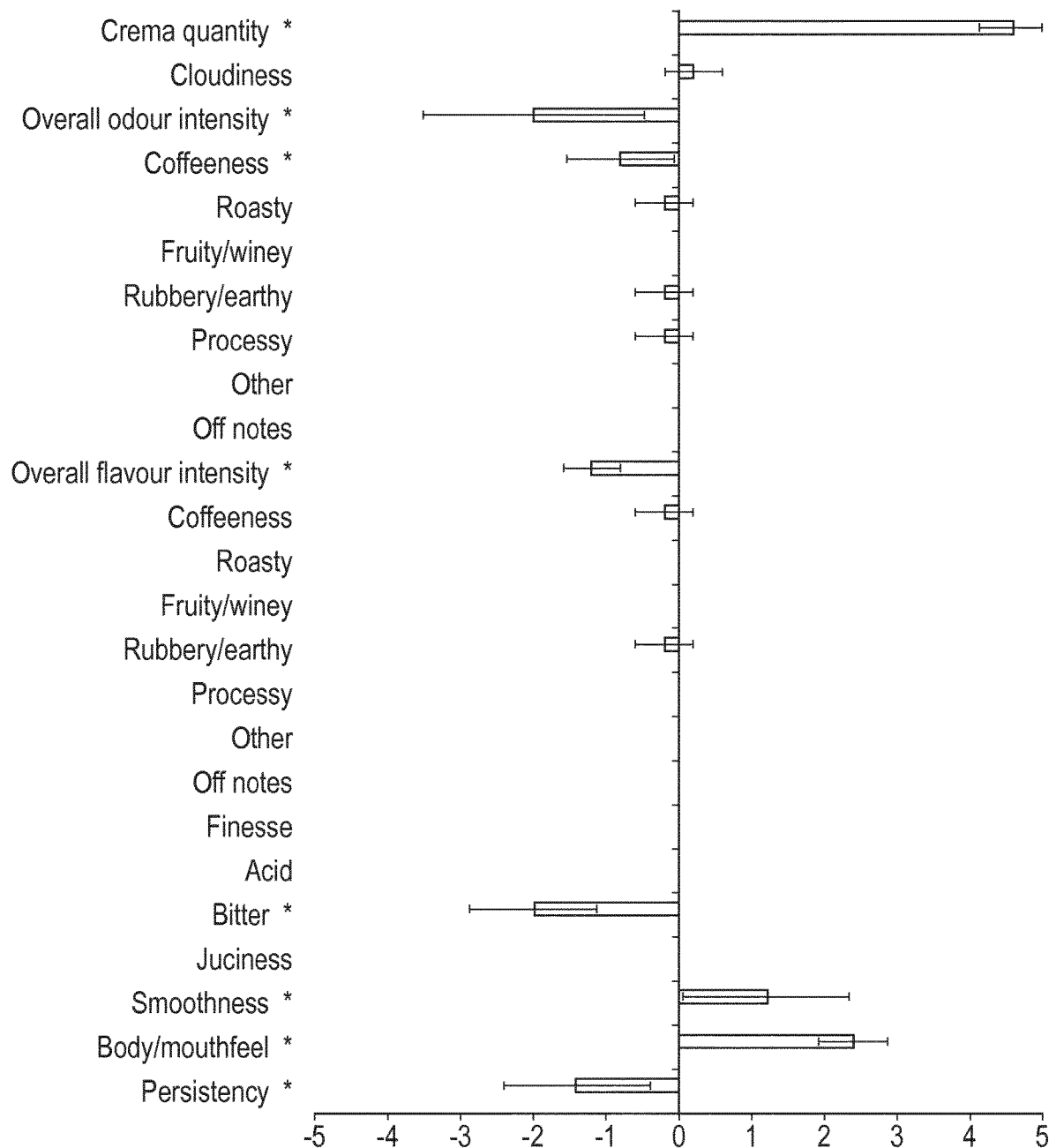
FIG. 3 presents a sensory profiling of the sample of the invention vs reference. Nescafe Gold soluble coffee powder (HYC) was used.

Sensory profiling of the sample of the invention vs reference is shown below (FIG. 3). Cup profile gives a smoother, more body/mouthfeel and less bitter cup profile than the reference. Profile was done by a panel of five tasters. Profiling was done with 2 types of NESCAFE® Gold soluble coffee.

Example 2

Preparation of Nitrogen Infused Coffee

Two coffee compositions (HYC: having yield higher than 25%, hydrolysis done at 180° C. and LYC having yield lower than 25%, extraction done at 25° C. followed by a membrane filtration to remove low molecular components less than 1 kD) were obtained using 1.3 wt % of the stable powder as described in example 1, dispersed in water stored at 4° C. These liquid coffee compositions were stored for 48 hours under 4 bars pressure in presence of nitrogen ($N_2$ gas) in a tank. Dispensing of the beverage was done using a faucet/beer tap.

Beverage Characterization

Beverage is dispensed through faucet in the form of an homogeneous foam made of fine bubbles dispersed homogeneously all over the beverage.

After beverage production, the bubbles are instantaneously creaming due to density difference between air and continuous liquid phase.

After 3 minutes, a large majority of bubble has creamed forming a foam layer on the top of the beverage: the coffee crema.

Coffee crema evolves over time due to bubble coalescence, Ostwald ripening and liquid drainage.

In order to characterize the beverage, photometry was used. A photographic picture of the sample is made using CoffeeCam (Newtone Technologies, France) from top and/or side view in a controlled light environment followed by a robust and accurate image analysis in the CIE Lab colorimetric space.

In the specific case of layer detection (ie a coffee crema on top of a liquid coffee phase), a layer can be considered as a discontinuity in colour in the beverage. By analysing the boundary between different layers in the disclosed beverage, one is capable of determining the volume of coffee cream in said beverage as the container geometry is known. By looking at the volume of coffee cream at time t=0 and subtracting the volume of coffee cream at said t=200 s for example and dividing this value by the total time, the coffee cream destabilisation rate can be obtained. This value indicates the firmness of the coffee cream. The smaller the value, the more stable the coffee creama. The destabilization rate is expressed in percentage: (Initial foam height−foam height after 1800 s)×100/Initial foam height. Foam heights have been measured form the side view with the CoffeeCam (Newtone Technologies, France) spectrophotometer.

It was found that the destabilization rate was approximately three times lower for the beverage of the present invention (liquid coffee beverage with anhydrocarbohydrate content of around 40% w/w infused with nitrogen gas) than the reference (liquid coffee beverage with anhydrocarbohydrate content of around 10% w/w infused with nitrogen gas).

Foam is also characterized regarding its texture with a standard Rheometer (Discovery HR2, TA Instruments, US) with a cup and vane geometry. A flow curve from 0.1 up to 100 s−1 is performed.

High shear viscosity and yield stress are used to defined foam rheology.

The coffee powder to produce the beverage is also characterized through its anhydrocarbohydrate content. The latter is determined through high pressure chromatography using anion exchange stationary phase with amperometric detection and after compete hydrolysis for the sample. Carbohydrate molecular weight distribution was performed using size exclusion chromatography. Then in line hydrolysis with sulfuric acid adding 3,5 dihydroxytoluen with colorimetric detection. Response is therefore proportional to total carbohydrates monomers as 3,5 dihydroxytoluen is selective with carbs.

Figure 2:
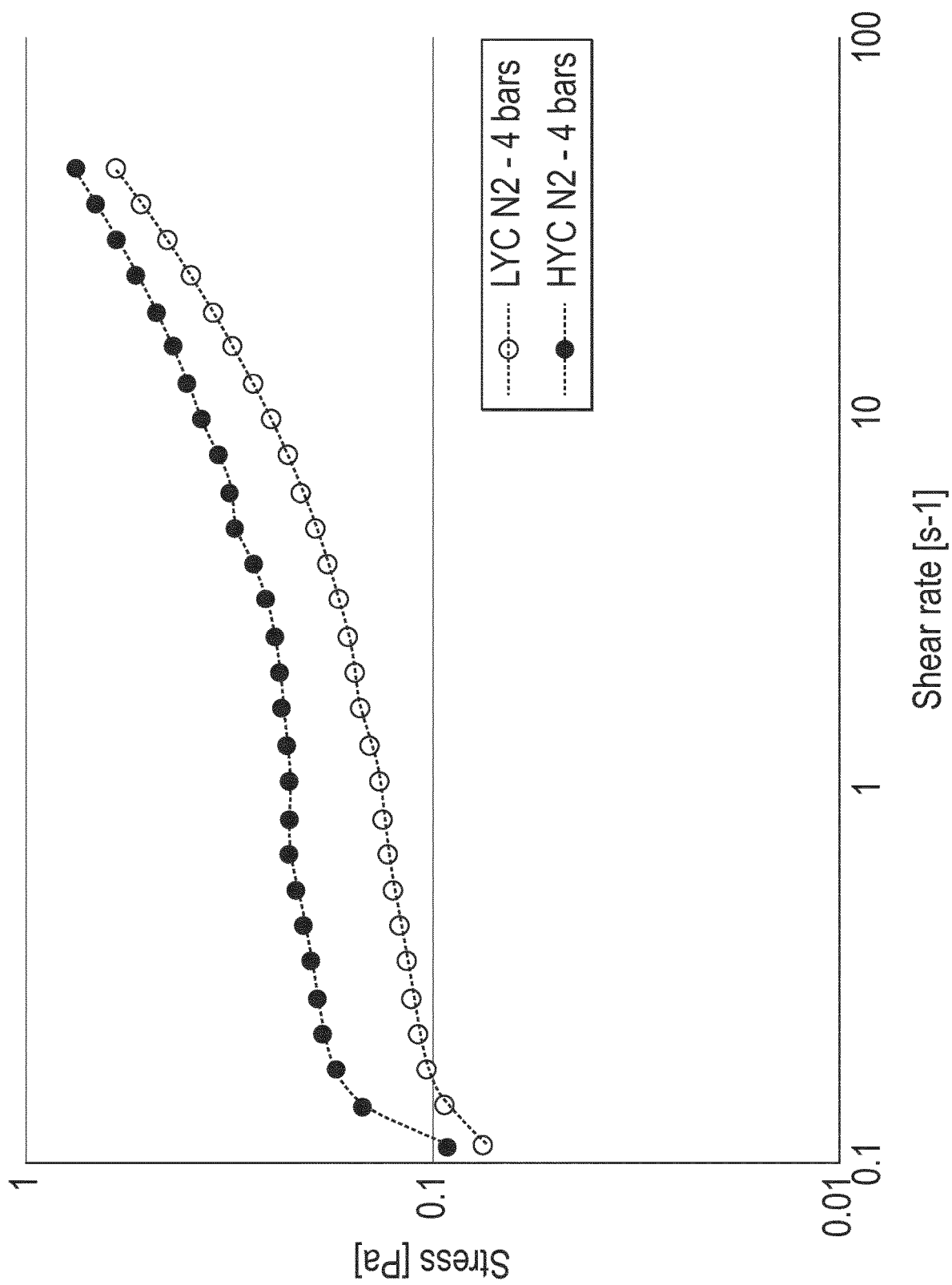
FIG. 2 presents a measurement of foam rheology using nitrogen infused coffee extract of HYC and LYC. With a higher yield stress (stress at low shear rate), and higher viscosity at higher shear, foam obtained from HYC is more thick than foam obtained from LYC.

FIG. 1 shows foamability and foam stability measurement for the beverage of the present invention. FIG. 2 shows foam rheology for the beverage of the present invention.

The invention claimed is:

1. A process of preparing a beverage, wherein the process comprises the steps of:
(i) extracting coffee solids from roasted and ground coffee beans comprising roast and ground (R&G) coffee solids, using water at a temperature between 100° C. and 200° C. to obtain a coffee extract which has an extraction yield above 25% based on the roast and ground (R&G) coffee solids;
(ii) drying the coffee extract obtained from step (i) to a powder;
(iii) reconstituting the powder obtained from step (ii) in liquid to form a liquid composition comprising the coffee extract; and
(iv) infusing nitrogen gas into the liquid composition comprising the coffee extract, wherein the liquid composition infused with the nitrogen gas is the beverage and has a minimum of 1.3% of coffee solids by total weight of the beverage.

2. The process of claim 1, wherein the beverage has an anhydrocarbohydrate content between 25 and 42% w/w.

3. The process of claim 1, wherein the nitrogen gas infused into the liquid composition has at least 99.5% N2.

4. A process of preparing a beverage, wherein the process comprises the steps of:
(i) extracting coffee solids from roasted and ground coffee beans comprising roast and ground (R&G) coffee solids, using water at a temperature between 100° C. and 200° C. to obtain a coffee extract which has an extraction yield above 25% based on the roast and ground (R&G) coffee solids;
(ii) diluting the coffee extract obtained from step (i) in liquid to form a liquid composition comprising the coffee extract and
(iii) infusing nitrogen gas into the liquid composition comprising the coffee extract, wherein the liquid composition infused with the nitrogen gas is the beverage and has a minimum of 1.3% of coffee solids by total weight of the beverage, wherein the liquid composition comprising the coffee extract is pressurized with the nitrogen gas at about 2-4 bar for 48 hrs at about 4-8° C.

5. The process of claim 4, wherein the beverage has an anhydrocarbohydrate content between 25 and 42% w/w.

6. The process of claim 4, wherein the nitrogen gas infused into the liquid composition has at least 99.5% N2.

* * * * *